United States Patent
Shi

(10) Patent No.: US 12,077,396 B2
(45) Date of Patent: Sep. 3, 2024

(54) APPARATUS AND METHOD FOR SEPARATING OBJECTS

(71) Applicant: ABB Schweiz AG, Baden (CH)

(72) Inventor: Guoqi Shi, Shanghai (CN)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 17/759,591

(22) PCT Filed: Apr. 26, 2020

(86) PCT No.: PCT/CN2020/086947
§ 371 (c)(1),
(2) Date: Jul. 27, 2022

(87) PCT Pub. No.: WO2021/217290
PCT Pub. Date: Nov. 4, 2021

(65) Prior Publication Data
US 2023/0075187 A1    Mar. 9, 2023

(51) Int. Cl.
*B65G 59/02* (2006.01)
*B65G 43/08* (2006.01)

(52) U.S. Cl.
CPC .............. *B65G 59/02* (2013.01); *B65G 43/08* (2013.01); *B65G 2201/022* (2013.01)

(58) Field of Classification Search
CPC ............ B65H 2220/01; B65H 2220/02; B65H 2511/15; B65H 2511/20; B65H 3/48
USPC ........................................... 271/97, 98
See application file for complete search history.

(56) References Cited

U.S. PATENT DOCUMENTS

| | | | |
|---|---|---|---|
| 4,743,006 A * | 5/1988 | Bolle, Jr. | B65H 3/66 271/18.1 |
| 5,110,110 A | 5/1992 | Wirz | |
| 5,392,630 A * | 2/1995 | Marinoni | B65G 61/00 414/797 |
| 6,086,321 A * | 7/2000 | Takahashi | B25J 9/1612 414/793 |

(Continued)

FOREIGN PATENT DOCUMENTS

| CN | 104444396 A | 3/2015 |
|---|---|---|
| CN | 106800192 A | 6/2017 |

(Continued)

OTHER PUBLICATIONS

International Search Report and Written Opinion, issued by the ISA/CN National Intellectual Property Administration; regarding corresponding patent application Serial No. PCT/CN2020/086947; dated Jan. 28, 2021; 9 pages.

*Primary Examiner* — Gregory W Adams
(74) *Attorney, Agent, or Firm* — Greenberg Traurig, LLP

(57) ABSTRACT

Embodiments of present disclosure relate to an apparatus and a method for separating objects. The apparatus comprises: a separating mechanism configured to separate objects arranged in a stack; a robot configured to hold the separating mechanism; and a controller configured to: cause the robot to move the separating mechanism to a first height; cause the robot to move the separating mechanism towards the stack; in response to a distance between the separating mechanism and the stack reaching a distance threshold, cause the robot to stop moving the separating mechanism; and cause the separating mechanism to separate the objects.

19 Claims, 5 Drawing Sheets

(56) References Cited

U.S. PATENT DOCUMENTS

| | | | | |
|---|---|---|---|---|
| 6,311,826 | B1* | 11/2001 | Tischler | B21C 51/00 |
| | | | | 198/395 |
| 6,468,025 | B1* | 10/2002 | Stumpf | B65H 3/0816 |
| | | | | 271/18.1 |
| 6,611,345 | B1* | 8/2003 | Luxem | G01B 11/028 |
| | | | | 356/615 |
| 7,444,850 | B2* | 11/2008 | Bauersachs | B21J 13/10 |
| | | | | 72/422 |
| 8,186,668 | B2* | 5/2012 | Wardak | B65H 3/48 |
| | | | | 271/97 |
| 8,573,918 | B2* | 11/2013 | Lawson | B60C 25/05 |
| | | | | 157/16 |
| 8,894,063 | B2* | 11/2014 | Araaki | B65H 1/00 |
| | | | | 271/145 |
| 9,079,733 | B2* | 7/2015 | Wardak | B65H 3/124 |
| 2005/0230897 | A1* | 10/2005 | Canini | B65H 3/322 |
| | | | | 270/58.11 |
| 2008/0012202 | A1* | 1/2008 | Hubl | B65H 3/10 |
| | | | | 700/1 |
| 2009/0082901 | A1* | 3/2009 | Schneider | B65H 3/322 |
| | | | | 700/213 |
| 2014/0079525 | A1 | 3/2014 | Krimpmann | |
| 2017/0158437 | A1 | 6/2017 | Namuduri | |
| 2017/0232496 | A1* | 8/2017 | Pons Bertran | B65H 1/30 |
| | | | | 72/361 |
| 2018/0085815 | A1* | 3/2018 | Mayoral Rojals | B65H 3/48 |
| 2018/0193899 | A1 | 7/2018 | Kizilkan | |

FOREIGN PATENT DOCUMENTS

| | | |
|---|---|---|
| CN | 107010422 A | 8/2017 |
| CN | 107082288 A | 8/2017 |
| CN | 107108138 A | 8/2017 |
| CN | 107406206 A | 11/2017 |
| CN | 206645552 U | 11/2017 |
| CN | 207511435 U | 6/2018 |
| CN | 207888667 U | 9/2018 |
| CN | 208531704 U | 2/2019 |
| CN | 110092207 A | 8/2019 |
| CN | 110775622 A | 2/2020 |
| DE | 3534036 A1 | 3/1987 |
| DE | 19834492 A1 | 2/2000 |
| DE | 19961648 A1 | 7/2001 |
| DE | 102016123492 A1 | 6/2017 |
| EP | 0494556 B1 | 3/1996 |
| FR | 2948311 A1 | 1/2011 |
| FR | 2973019 A1 | 9/2012 |
| JP | H098095 A | 1/1997 |
| JP | H4317935 A | 2/1999 |
| JP | 2002336923 A | 11/2002 |
| JP | 2006143468 A | 6/2006 |
| KR | 100764488 B1 | 10/2007 |
| KR | 101949087 B1 | 2/2019 |
| KR | 20200004610 A | 1/2020 |
| SU | 1113344 A1 | 9/1984 |
| SU | 1150052 A1 | 4/1985 |
| WO | 2009050953 A1 | 4/2009 |

* cited by examiner

APPARATUS AND METHOD FOR SEPARATING OBJECTS

CROSS-REFERENCE TO RELATED APPLICATIONS

This is a national stage application which claims priority to International patent application Serial No.: PCT/CN2020/086947, filed on Apr. 26, 2020; and which is herein incorporated by reference in its entirety.

FIELD

Embodiments of present disclosure generally relate to the field of separating objects in a stack, and more particularly, to an apparatus and a method for separating objects, a computer readable medium, and a system for separating and conveying objects.

BACKGROUND

In an automatic stamping production line, a first procedure of the whole line is to separate objects in a stack, such as steel blanks, aluminum blanks or nonmetallic material blanks, and use a tooling driven by a robot to pick up an object separated from the stack. Then, the object may be put onto a conveyor and transferred to a next procedure via the conveyor. Since the objects in the stack are closely adhered to each other, the separating effect of the objects directly affects normal operation of the whole production line.

A conventional separating mechanism is typically mounted on a linear guide and may be driven to move towards or away from the objects along the linear guide. Such a separating mechanism has less degrees of freedom and low flexibility. Thus, the separating efficiency of the objects is relatively low, which may adversely affect the normal operation of the whole production line.

Thus, there is a need for an improved apparatus and method for separating objects in a stack.

SUMMARY

In view of the foregoing problems, various example embodiments of the present disclosure provide solutions for separating objects in a stack.

In a first aspect of the present disclosure, example embodiments of the present disclosure provide an apparatus for separating objects. The apparatus comprises: a separating mechanism configured to separate objects arranged in a stack; a robot configured to hold the separating mechanism; and a controller configured to: cause the robot to move the separating mechanism to a first height; cause the robot to move the separating mechanism towards the stack; in response to a distance between the separating mechanism and the stack reaching a distance threshold, cause the robot to stop moving the separating mechanism; and cause the separating mechanism to separate the objects.

According to embodiments of the present disclosure, the separating mechanism may be driven by the robot to appropriate positions so as to reliably separate the objects in the stack. Compared with the conventional separating mechanism, the apparatus for separating objects according to the present disclosure may provide more degrees of freedom, higher flexibility, better adaptability, higher positioning accuracy, simpler mechanism, fewer failure points, and higher standardization. Thus, the reliability and separating efficiency of the separating mechanism is improved. Moreover, it is of great significance for simplifying the layout of the destacking area.

In some embodiments, the first height has a preset value.

In some embodiments, the apparatus further comprises a height sensor configured to measure an initial height of the stack, wherein the controller is further configured to: determine the first height based on the initial height of the stack.

In some embodiments, the apparatus further comprises a height sensor configured to measure a height of the stack, wherein the controller is further configured to: in response to a determination that the height of the stack has been reduced by more than a predefined amount, cause the robot to move the separating mechanism to a second height lower than the first height; cause the robot to lock the separating mechanism at the second height; and cause the separating mechanism to separate the objects.

In some embodiments, the controller is further configured to: in response to a determination that a predefined number of objects have been separated from the stack, cause the robot to move the separating mechanism to a third height lower than the first height; cause the robot to lock the separating mechanism at the third height; and cause the separating mechanism to separate the objects.

In some embodiments, the separating mechanism is configured to separate the objects by at least one of an air flow, a magnetic force, and a saw tooth strip.

In some embodiments, the apparatus further comprises a distance sensor configured to detect the distance between the separating mechanism and the stack.

In some embodiments, the distance sensor comprises a travel switch configured to be triggered when the distance between the separating mechanism and the stack reaches the distance threshold.

In some embodiments, the apparatus further comprises: a triggering member arranged near to the separating mechanism and configured to trigger the travel switch when the distance between the separating mechanism and the stack reaches the distance threshold; and a spring coupled to the triggering member and configured to reset the triggering member when the separating mechanism is moved away from the stack.

In some embodiments, the distance sensor comprises a proximity sensor configured to detect the distance between the separating mechanism and the stack.

In some embodiments, the objects are blanks made of steel, aluminum or nonmetallic material.

In a second aspect of the present disclosure, example embodiments of the present disclosure provide a method for separating objects. The method comprises: causing a robot to move a separating mechanism to a first height, the separating mechanism being held by the robot; causing the robot to move the separating mechanism towards the stack; in response to a distance between the separating mechanism and the stack reaching a distance threshold, causing the robot to stop moving the separating mechanism; and causing the separating mechanism to separate the objects.

In some embodiments, the first height has a preset value.

In some embodiments, the method further comprises: determining the first height based on an initial height of the stack measured by a height sensor.

In some embodiments, the method further comprises: in response to a determination that a height of the stack measured by a height sensor has been reduced by more than a predefined amount, causing the robot to move the separating mechanism to a second height lower than the first height; causing the robot to lock the separating mechanism at the second height; and causing the separating mechanism to separate the objects.

In some embodiments, the method further comprises: in response to a determination that a predefined number of objects have been separated from the stack, causing the robot to move the separating mechanism to a third height lower than the first height; causing the robot to lock the separating mechanism at the third height; and causing the separating mechanism to separate the objects.

In some embodiments, the separating mechanism is configured to separate the objects by at least one of an air flow, a magnetic force, and a saw tooth strip.

In a third aspect of the present disclosure, example embodiments of the present disclosure provide a computer readable medium having instructions stored thereon, the instructions, when executed on at least one processor, cause the at least one processor to perform the method according to the second aspect of the present disclosure.

In a fourth aspect of the present disclosure, example embodiments of the present disclosure provide a system for separating and conveying objects, comprising: at least one apparatus according to the first aspect of the present disclosure configured to separate objects arranged on a destacker cart; a further robot configured to grab objects separated from the destacker cart and place the grabbed objects; and a conveyor configured to receive the objects from the further robot and convey the received objects.

In some embodiments, the destacker cart is liftable or has a constant height, and wherein the destacker cart is movable or fixed.

It is to be understood that the Summary section is not intended to identify key or essential features of embodiments of the present disclosure, nor is it intended to be used to limit the scope of the present disclosure. Other features of the present disclosure will become easily comprehensible through the following description.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
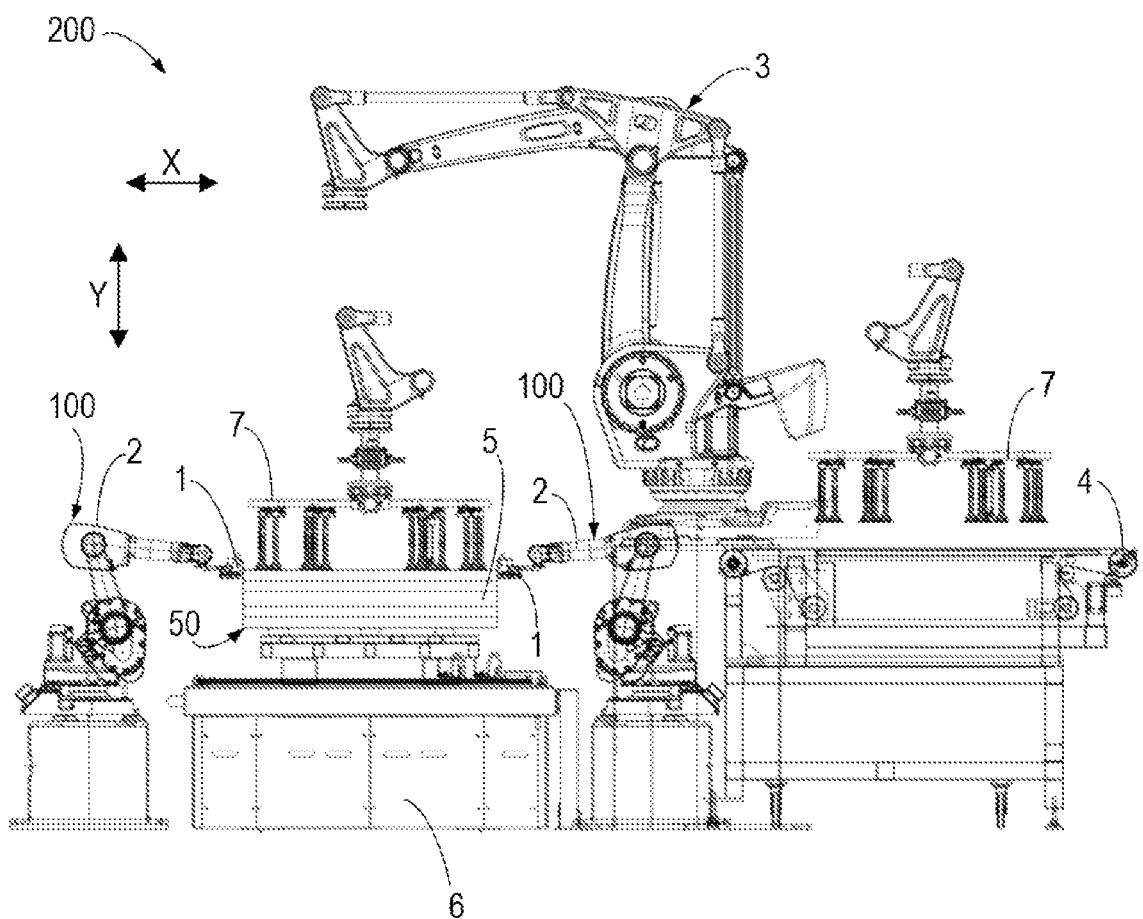
FIG. 1 illustrates in a front view a schematic diagram of a system for separating and conveying objects in accordance with embodiments of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

As described above, the conventional separating mechanism has less degrees of freedom and low flexibility, and thus the separating efficiency of the separating mechanism is relatively low, which may adversely affect the normal operation of the whole production line. According to embodiments of the present disclosure, a separating mechanism may be driven by a robot to appropriate positions so as to reliably separate the objects in the stack. The above idea may be implemented in various manners, as will be described in detail in the following paragraphs.

Hereinafter, the principles of the present disclosure will be described in detail with reference to FIGS. 1-5. Referring FIGS. 1-2 first, FIG. 1 schematically illustrates a system 200 for separating and conveying objects in a front view and FIG. 2 schematically illustrates the system 200 in a top view.

Figure 2:
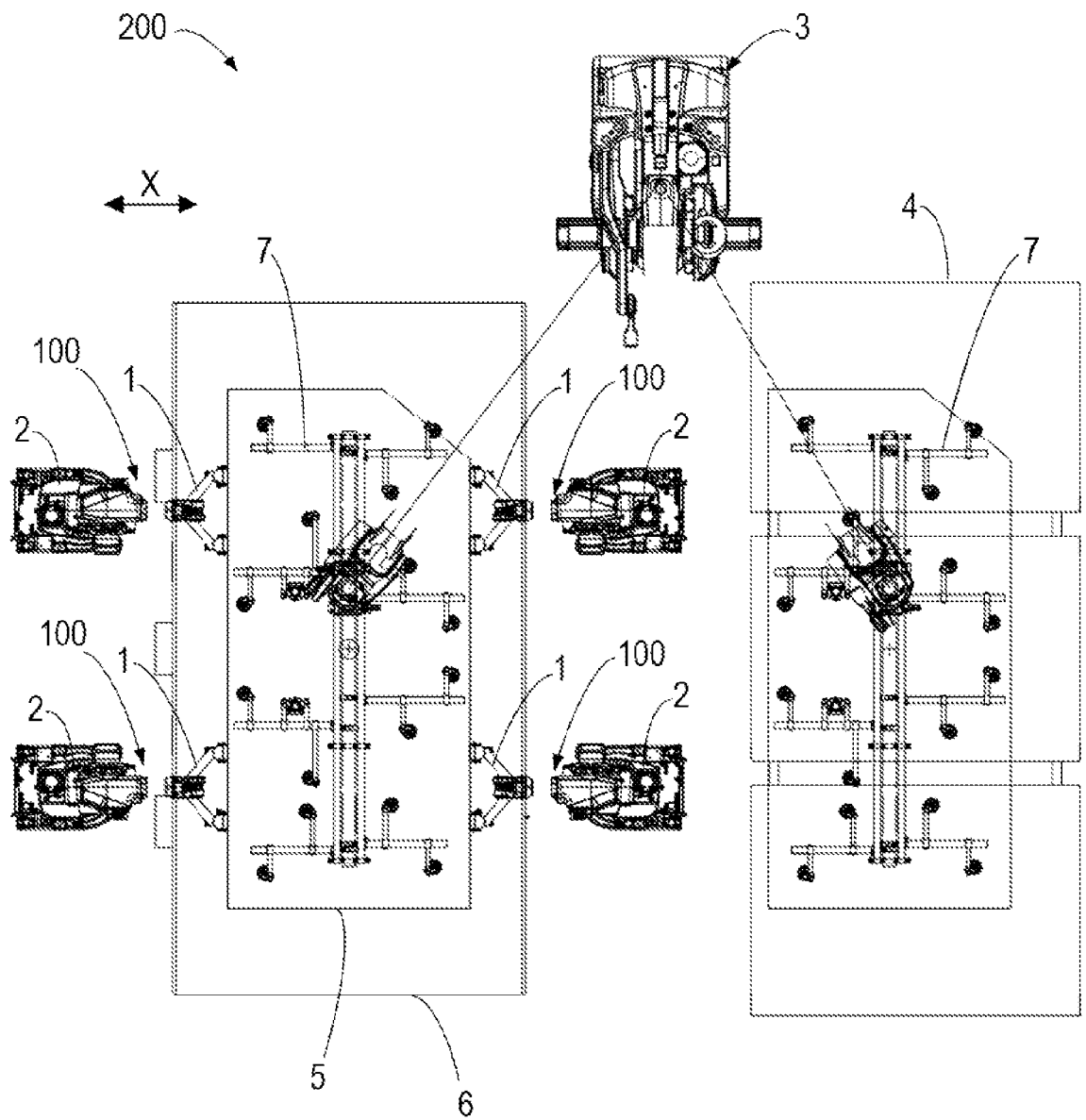
FIG. 2 illustrates in a top view a schematic diagram of the system as shown in FIG. 1.

Generally, as shown in FIGS. 1 and 2, the system 200 can be used for separating and conveying objects 5. The objects 5 are arranged in a stack 50 in a vertical direction Y. An example for the objects 5 to be processed is blanks in a production line (e.g., an automobile press line). For example, the blanks may be made of steel, aluminum or nonmetallic material. Although some embodiments may be described with reference to such example objects, it is to be understood that embodiments of the present disclosure can be used with any other suitable objects like blanks, sheets, and parts and so on.

As shown in FIG. 1, a destacker cart 6 is provided to support the objects 5 in the stack 50. The destacker cart 6 may be liftable or have a constant height. In addition, the destacker cart 6 may be movable or fixed. The scope of the present disclosure is not intended to be limited in this respect.

In an embodiment, as shown in FIGS. 1 and 2, the system 200 includes a plurality of apparatuses 100 for separating the objects 5 in the stack 50, such as four. On each side of the stack 50, two apparatuses 100 may be arranged. Each apparatus 100 includes a separating mechanism 1, a robot 2 and a controller (not shown). The separating mechanism 1 is held by the corresponding robot 2. Under driving of the robot 2, the separating mechanism 1 may move to appropriate positions so as to separate the objects 5 in the stack 50. The operation of the separating mechanism 1 and the robot 2 is controlled by the corresponding controller.

In other embodiments, the system 200 may include more or less apparatuses 100, such as one, two, three, five, six, or even more. The scope of the present disclosure is not intended to be limited in this respect.

In some embodiments, each apparatus 100 may include an individual controller. In other embodiments, some or all of the apparatuses 100 may share a single controller. The scope of the present disclosure is not intended to be limited in this respect.

In some embodiments, the separating mechanism 1 may provide an air flow for blowing and thus separating the objects 5 placed on the destacker cart 6. This may be suitable for separating the objects 5 made of lightweight materials, such as aluminum or nonmetallic material. Alternatively, or in addition, in some embodiments, the separating mechanism 1 may be provided with a magnet for separating the objects 5 by a magnetic force. This may be suitable for separating the objects 5 that are made of magnetizable material, such as steel. In some embodiments, the separating mechanism 1 may include a saw tooth strip configured to lift an edge of an upmost one of the objects 5 through teeth. This may be suitable for separating the objects 5 made of various materials, such as steel, aluminum or nonmetallic material.

It is to be understood that separating approaches which can be implemented by the separating mechanism 1 may be conventional for separating objects 5 to be processed. Thus, the number, structure, and separating approaches of the separating mechanism 1 are not intended to be any limitation to embodiments as described above.

In addition, it is known that a separation of at least a portion of an object would reduce a force which bonds the objects 5 together. Thus, the objects 5 may be separated only at their edges or corners. That is, only a portion (e.g., edges or corners) of the object needs to be separated from an adjacent object.

As shown in FIGS. 1 and 2, in addition to the apparatuses 100, the system 200 further includes a further robot 3 and a conveyor 4. The robot 3 is configured to grab objects 5 separated from the destacker cart 6 and place the grabbed objects 5 on the conveyor 4. The conveyor 4 may convey the separated objects 5 to the next portion of the production line. In an embodiment, the robot 3 is adapted to attach a tooling 7. The tooling 7 may be configured to create a vacuum for grabbing objects 5. With such an arrangement, the objects 5 may be separated from the stack 50 and transferred to the next portion of the production line in an efficient way.

Hereinafter, the construction and operation of the apparatus 100 for separating the objects 5 would be described in detail with reference to FIGS. 1-4.

Figure 3:
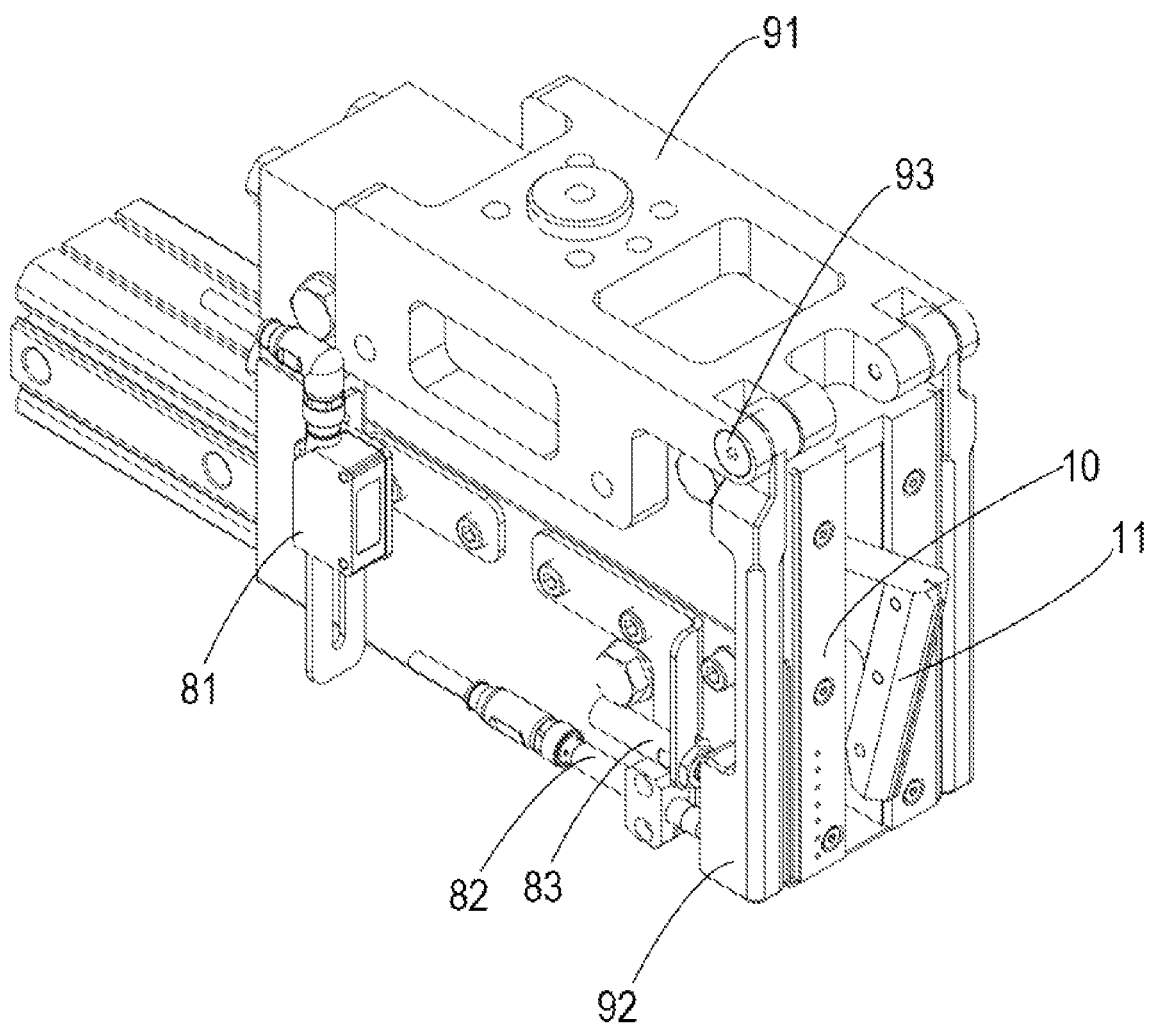
FIG. 3 illustrates a partial schematic diagram of an apparatus for separating objects according to an embodiment of the present disclosure.
Figure 4:
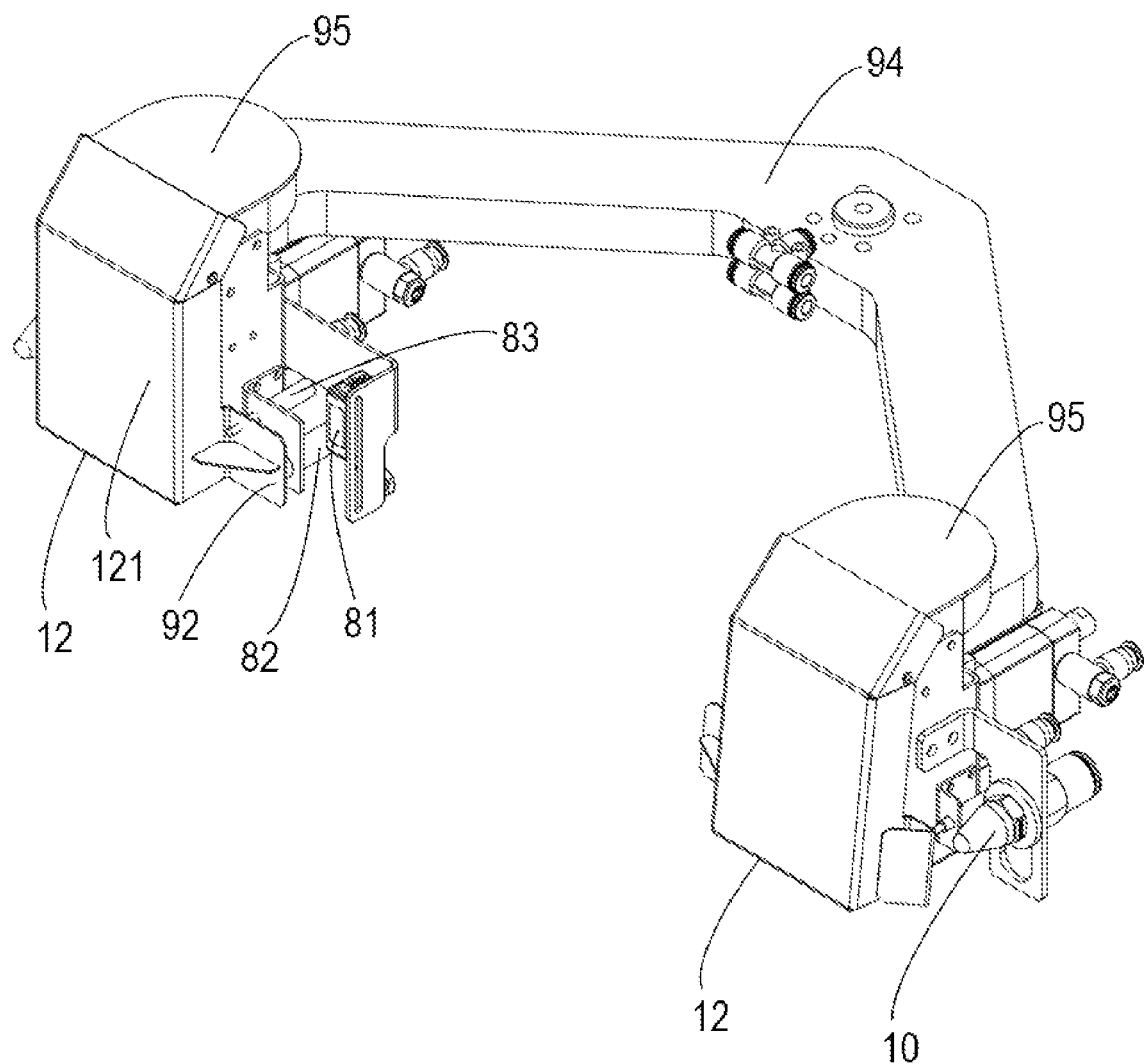
FIG. 4 illustrates a partial schematic diagram of an apparatus for separating objects according to another embodiment of the present disclosure.

As shown in FIGS. 1 and 2, during operation of the apparatus 100, the controller first causes the robot 2 to move the separating mechanism 1 to a first height. The first height may be equal or close to an initial height of the stack 50 so as to position the separating mechanism 1 to be substantially aligned with the upmost object 5 in the stack 50 in the vertical direction Y initially. In an embodiment, the first height has a preset value and may be stored in the controller or a memory. In another embodiment, the first height may be determined based on the initial height of the stack 50. To obtain the initial height of the stack 50, a height sensor 81 is provided, as shown in FIGS. 3 and 4. The height sensor 81 may detect the height of the stack 50 in various manners. For example, the height sensor 81 may emit light towards the stack 50 in a lateral direction X. The lateral direction X is substantially normal to the vertical direction Y. With the reflected light, the height sensor 81 may determine the height of the stack 50.

After positioning the separating mechanism 1 at the first height, the controller causes the robot 2 to move the separating mechanism 1 towards the stack 50 in the lateral direction X. In an embodiment, the separating mechanism 1 may approach the stack 50 at a high speed first and at a low speed then. In other embodiments, the separating mechanism 1 may approach the stack 50 at other speeds. The scope of the present disclosure is not limited in this respect.

When a distance between the separating mechanism 1 and the stack 50 is appropriate, the robot 2 would lock the position of the separating mechanism 1. According to embodiments of the present disclosure, in response to the distance between the separating mechanism 1 and the stack 50 reaching a distance threshold, the controller causes the robot 2 to stop moving the separating mechanism 1. At this position, the separating mechanism 1 is suitable for separating the objects 5 in the stack 50. Then, the controller causes the separating mechanism 1 to separate the objects 5.

As the objects 5 are removed from the stack 50 and thus the height of the stack 50 is reduced, the robot 2 needs to lower the position of the separating mechanism 1 according to the number of objects 5 that have been separated from the stack 50 or the signal from the height sensor 81 to ensure the top several objects in the stack 50 are in the best work scope of the separating mechanism 1.

To this end, in an embodiment, the controller causes the robot 2 to move the separating mechanism 1 to a second height lower than the first height, in response to a determination that the height of the stack 50 has been reduced by more than a predefined amount. Then, the controller causes the robot 2 to lock the separating mechanism 1 at the second height and causes the separating mechanism 1 to separate the objects 5. The step length of the separating mechanism 1, i.e., the difference between the first and second heights may be dependent on the types of the separating mechanism 1 or other factors.

In another embodiment, the controller causes the robot 2 to move the separating mechanism 1 to a third height lower than the first height, in response to a determination that a predefined number of objects 5 have been separated from the stack 50. Then, the controller causes the robot 2 to lock the separating mechanism 1 at the third height, and causes the separating mechanism 1 to separate the objects 5. According to embodiments of the present disclosure, the third height may be equal to or different from the second height.

As the height of the stack 50 is further reduced, the robot 2 may further lower the position of the separating mechanism 1 according to the number of objects 5 that have been separated from the stack 50 or the signal from the height sensor 81 until all the objects 5 in the stack 50 have been separated.

In an embodiment, to detect the distance between the separating mechanism 1 and the stack 50, a distance sensor 82 is provided, as shown in FIGS. 3 and 4.

In some embodiments, the distance sensor 82 includes a travel switch configured to be triggered when the distance between the separating mechanism 1 and the stack 50 reaches the distance threshold. To enable the triggering of the travel switch, the apparatus 100 further includes a triggering member 92 and a spring 83 coupled to the triggering member 92, as shown in FIGS. 3 and 4.

The triggering member 92 is arranged near to the separating mechanism 1 and configured to trigger the travel switch when the distance between the separating mechanism 1 and the stack 50 reaches the distance threshold. In an embodiment, as shown in FIG. 3, the triggering member 92 is rotatably mounted onto a frame 91 via a rotation shaft 93. When the distance between the separating mechanism 1 and the stack 50 reaches the distance threshold, the triggering member 92 may be pressed by the side of the stack 50 and thus trigger the travel switch. In another embodiment, as shown in FIG. 4, the triggering member 92 is connected to a cover 121 of a magnetic separating mechanism 12. When the distance between the separating mechanism 1 and the stack 50 reaches the distance threshold, the cover 121 of the magnetic separating mechanism 12 may be pressed by the side of the stack 50, and thus the triggering member 92 may trigger the travel switch.

When the travel switch is triggered, the travel switch would send a trigger signal to the controller. Then, the controller will cause the robot 2 to lock the position of the separating mechanism 1 and cause the separating mechanism 1 to separate the objects 5.

The spring 83 is configured to reset the triggering member 92 when the separating mechanism 1 is moved away from the stack 50. When the separating mechanism 1 is at the locking position, the spring 83 would be pressed, and when the separating mechanism 1 is moved away from the stack 50, the spring 83 may return to its release condition.

In some embodiments, the distance sensor 82 includes a proximity sensor configured to detect the distance between the separating mechanism 1 and the stack 50 and send the detected distance to the controller. Based on the distance, the controller may determine the locking position of the separating mechanism 1.

According to embodiments of the present disclosure, each apparatus 100 may include one or more separating mechanisms 1. As an example, the apparatus 100 as shown in FIG. 3 may include a saw tooth strip 11 and an air blowing device 10 as the separating mechanism 1. As another example, the apparatus 100 as shown in FIG. 4 may include an air blowing device 10 and two magnetic separating mechanisms 12 as the separating mechanism 1. The two magnetic separating mechanisms 12 are arranged on opposite sides of a support 94 adapted to be held by the robot 2. In addition, adaptive rotating mechanisms 95 are provided between the opposite sides of the support 94 and the corresponding separating mechanism 1 so as to automatically adjust the orientation of the separating mechanism 1 relative to the stack 50.

According to embodiments of the present disclosure, the separating mechanism 1 may be driven by the robot 2 to appropriate positions so as to reliably separate the objects 5 in the stack 50. Compared with the conventional separating mechanism, the apparatus 100 for separating objects 5 according to the present disclosure may provide more degrees of freedom, higher flexibility, better adaptability, higher positioning accuracy, simpler mechanism, fewer failure points, and higher standardization. Thus, the reliability and separating efficiency of the separating mechanism 1 is improved. Moreover, it is of great significance for simplifying the layout of the destacking area.

Figure 5:
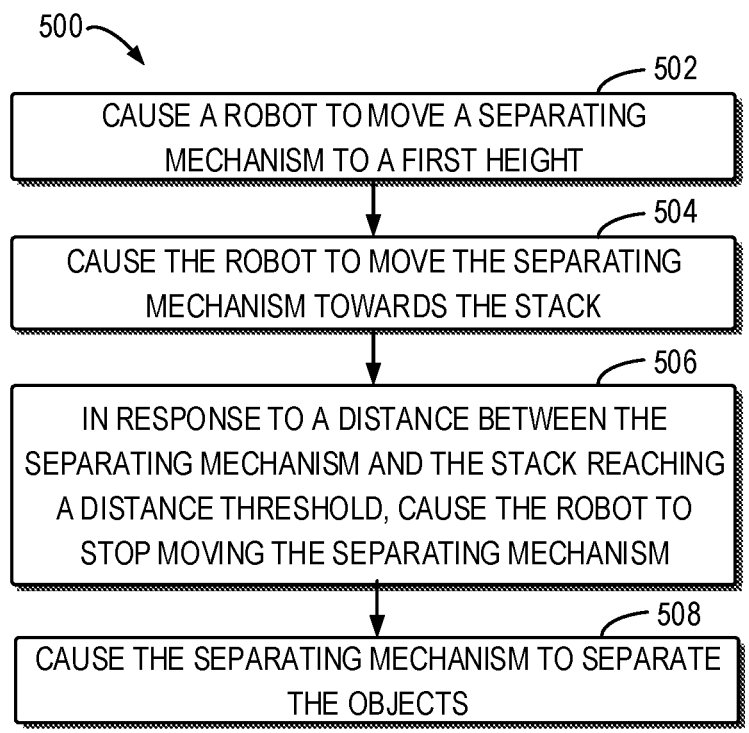
FIG. 5 is a flow chart of a method for separating objects according to embodiments of the present disclosure.

FIG. 5 is a flow chart of a method for separating objects according to embodiments of the present disclosure. The method 500 can be performed by for example the apparatus 100 (specifically, the controller in the apparatus 100) as described above with respect to FIGS. 1-4.

At block 502, the controller causes the robot 2 to move the separating mechanism 1 to the first height.

At block 504, the controller causes the robot 2 to move the separating mechanism 1 towards the stack 50.

At block 506, in response to a distance between the separating mechanism 1 and the stack 50 reaching a distance threshold, the controller causes the robot 2 to stop moving the separating mechanism 1.

At block 506, the controller causes the separating mechanism 1 to separate the objects 5.

In some embodiments, the method 500 further includes determining the first height based on an initial height of the stack 50 measured by a height sensor 81.

In some embodiments, the method 500 further includes causing the robot 2 to move the separating mechanism 1 to a second height lower than the first height. in response to a determination that a height of the stack 50 measured by a height sensor 81 has been reduced by more than a predefined amount; causing the robot 2 to lock the separating mechanism 1 at the second height; and causing the separating mechanism 1 to separate the objects 5.

In some embodiments, the method 500 further includes causing the robot 2 to move the separating mechanism 1 to a third height lower than the first height, in response to a determination that a predefined number of objects 5 have been separated from the stack 50; causing the robot 2 to lock the separating mechanism 1 at the third height; and causing the separating mechanism 1 to separate the objects 5.

In some embodiments of the present disclosure, a computer readable medium is provided. The computer readable medium has instructions stored thereon, and the instructions, when executed on at least one processor, may cause at least one processor to perform the method for separating objects as described in the preceding paragraphs, and details will be omitted hereinafter.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An apparatus for separating objects, comprising:
   a separating mechanism configured to separate objects arranged in a stack;
   a distance sensor configured to detect a distance between the separating mechanism and the stack,
      wherein the distance sensor comprises a travel switch configured to be triggered when the distance between the separating mechanism and the stack reaches a distance threshold;

a robot configured to hold the separating mechanism; and
a controller configured to:
  cause the robot to move the separating mechanism to a first height;
  cause the robot to move the separating mechanism towards the stack;
  in response to the distance between the separating mechanism and the stack reaching the distance threshold, cause the robot to stop moving the separating mechanism; and
  cause the separating mechanism to separate the objects.

2. The apparatus according to claim 1, wherein the first height has a preset value.

3. The apparatus according to claim 1, further comprising a height sensor configured to measure an initial height of the stack, wherein the controller is further configured to:
  determine the first height based on the initial height of the stack.

4. The apparatus according to claim 1, wherein the controller is further configured to:
  in response to a determination that a predefined number of objects have been separated from the stack, cause the robot to move the separating mechanism to a third height lower than the first height;
  cause the robot to stop moving the separating mechanism at the third height; and
  cause the separating mechanism to separate the objects.

5. The apparatus according to claim 1, wherein the separating mechanism is configured to separate the objects by at least one of an air flow, a magnetic force, and a saw tooth strip.

6. The apparatus according to claim 1, further comprising:
  a triggering member arranged near to the separating mechanism and configured to trigger the travel switch when the distance between the separating mechanism and the stack reaches the distance threshold; and
  a spring coupled to the triggering member and configured to reset the triggering member when the separating mechanism is moved away from the stack.

7. The apparatus according to claim 1, wherein the objects are blanks made of steel, aluminum or nonmetallic material.

8. A method for separating objects arranged in a stack, the method comprising:
  causing a robot to move a separating mechanism to a first height, the separating mechanism being held by the robot;
  causing the robot to move the separating mechanism towards the stack;
  in response to a distance between the separating mechanism and the stack reaching a distance threshold, causing the robot to stop moving the separating mechanism;
  causing the separating mechanism to separate the objects;
  in response to a determination that a predefined number of objects have been separated from the stack, causing the robot to move the separating mechanism to a third height lower than the first height;
  causing the robot to stop moving the separating mechanism at the third height; and
  causing the separating mechanism to separate the objects.

9. The method according to claim 8, wherein the first height has a preset value.

10. The method according to claim 8, further comprising: determining the first height based on an initial height of the stack measured by a height sensor.

11. The method according to claim 8, further comprising:
  in response to a determination that a height of the stack measured by a height sensor has been reduced by more than a predefined amount, causing the robot to move the separating mechanism to a second height lower than the first height;
  causing the robot to stop moving the separating mechanism at the second height; and
  causing the separating mechanism to separate the objects.

12. The method according to claim 8, wherein the separating mechanism is configured to separate the objects by at least one of an air flow, a magnetic force, and a saw tooth strip.

13. A computer readable medium having instructions stored thereon, the instructions, when executed on at least one processor, cause the at least one processor to perform the method according to claim 8.

14. A system for separating and conveying objects, comprising:
  at least one apparatus according to claim 1 configured to separate objects arranged on a destacker cart;
  a further robot configured to grab objects separated from the destacker cart and place the grabbed objects; and
  a conveyor configured to receive the objects from the further robot and convey the received objects.

15. The system according to claim 14, wherein the destacker cart is liftable or has a constant height, and wherein the destacker cart is movable or fixed.

16. An apparatus for separating objects, comprising:
  a separating mechanism configured to separate objects arranged in a stack;
  a robot configured to hold the separating mechanism;
  a height sensor configured to measure a height of the stack; and
  a controller configured to:
    cause the robot to move the separating mechanism to a first height;
    cause the robot to move the separating mechanism towards the stack;
    in response to a distance between the separating mechanism and the stack reaching a distance threshold, cause the robot to stop moving the separating mechanism;
    cause the separating mechanism to separate the objects;
    in response to a determination that the height of the stack has been reduced by more than a predefined amount, cause the robot to move the separating mechanism to a second height lower than the first height;
    cause the robot to stop moving the separating mechanism at the second height; and
    cause the separating mechanism to separate the objects.

17. The apparatus according to claim 16, wherein the height sensor is configured to measure an initial height of the stack, and the controller is further configured to:
  determine the first height based on the initial height of the stack.

18. The apparatus according to claim 16, further comprising:
  a distance sensor configured to detect the distance between the separating mechanism and the stack.

19. The apparatus according to claim 18, wherein the distance sensor comprises a proximity sensor configured to detect the distance between the separating mechanism and the stack.

* * * * *